(12) United States Patent
Ikegaya

(10) Patent No.: US 12,511,852 B2
(45) Date of Patent: Dec. 30, 2025

(54) INFORMATION PROCESSING METHOD, INFORMATION PROCESSING SYSTEM, AND PROGRAM

(71) Applicant: LINKWIZ INCORPORATED, Hamamatsu (JP)

(72) Inventor: Fumio Ikegaya, Hamamatsu (JP)

(73) Assignee: LINKWIZ INCORPORATED, Hamamatsu (JP)

(*) Notice: Subject to any disclaimer, the term of this patent is extended or adjusted under 35 U.S.C. 154(b) by 212 days.

(21) Appl. No.: 18/264,700

(22) PCT Filed: Feb. 15, 2022

(86) PCT No.: PCT/JP2022/005812
§ 371 (c)(1),
(2) Date: Aug. 8, 2023

(87) PCT Pub. No.: WO2022/173049
PCT Pub. Date: Aug. 18, 2022

(65) Prior Publication Data
US 2024/0119686 A1  Apr. 11, 2024

(30) Foreign Application Priority Data
Feb. 15, 2021 (JP) .................. 2021-022030

(51) Int. Cl.
*G06T 19/20* (2011.01)
(52) U.S. Cl.
CPC ...... *G06T 19/20* (2013.01); *G06T 2219/2004* (2013.01)
(58) Field of Classification Search
CPC .......... G06T 19/20; G06T 2219/2004

USPC ......................................... 345/419
See application file for complete search history.

(56) References Cited

U.S. PATENT DOCUMENTS

| 9,646,410 | B2* | 5/2017 | Collet Romea | .......... G06T 7/33 |
| 2009/0174729 | A1 | 7/2009 | Matsumoto | |
| 2015/0279085 | A1* | 10/2015 | Dell | ........ G06T 19/20 345/419 |

(Continued)

FOREIGN PATENT DOCUMENTS

| JP | 2008259705 A | 10/2008 |
| JP | 2009160306 A | 7/2009 |

(Continued)

OTHER PUBLICATIONS

Tagliasacchi, A. et al., "Curve Skeleton Extraction from incomplete Point Cloud," ACM Transactions on Graphics, vol. 28, No. 3, Jul. 27, 2009, 10 pages.

(Continued)

*Primary Examiner* — Thomas J Lett
(74) *Attorney, Agent, or Firm* — McCoy Russell LLP

(57) ABSTRACT

An information processing method, which is an invention according to a main aspect of the present invention, comprises acquiring three-dimensional model data, setting a reference plane around the acquired three-dimensional model data; setting regular position coordinates regularly arranged on the reference plane according to a predetermined rule; and generating model point coordinates at an intersection between a first virtual straight line extending from the regular position coordinates and the three-dimensional model data.

8 Claims, 13 Drawing Sheets

(56) References Cited

U.S. PATENT DOCUMENTS

| | | | | |
|---|---|---|---|---|
| 2016/0063754 | A1* | 3/2016 | Korchev | G06V 20/38 |
| | | | | 345/419 |
| 2017/0004649 | A1* | 1/2017 | Collet Romea | G06T 7/33 |
| 2018/0202814 | A1* | 7/2018 | Kudrynski | G01C 21/3815 |
| 2020/0210814 | A1 | 7/2020 | Mehr | |

FOREIGN PATENT DOCUMENTS

| | | |
|---|---|---|
| JP | 2012203894 A | 10/2012 |
| JP | 2020027654 A | 2/2020 |
| JP | 2020115337 A | 7/2020 |

OTHER PUBLICATIONS

"Photogrammetry mesh vs. laser scan cloud comparison," Cloud Compare Website, Available Online at https://www.cloudcompare.org/forum/viewtopic.php?t=5014, Feb. 3, 2021, 3 pages.

European Patent Office, Extended European Search Report Issued in Application No. 22752871.8, Nov. 27, 2024, Germany, 10 pages.

Japan Patent Office, Office Action Issued in Application No. 2021-022030, Mar. 4, 2021, 6 pages. (Submitted with Machine Translation).

Japan Patent Office, Decision of Refusal Issued in Application No. 2021-022030, Apr. 8, 2021, 6 pages. (Submitted with Machine Translation).

Japan Patent Office, Reconsideration Report by Examiner before Appeal Issued in Application No. 2021-022030, Sep. 22, 2021, 6 pages. (Submitted with Machine Translation).

\* cited by examiner

INFORMATION PROCESSING METHOD, INFORMATION PROCESSING SYSTEM, AND PROGRAM

CROSS REFERENCE TO RELATED APPLICATIONS

The present application is a U.S. National Phase of International Application No. PCT/JP2022/005812 entitled "INFORMATION PROCESSING METHOD, INFORMATION PROCESSING SYSTEM, AND PROGRAM, EACH OF WHICH USES SAID PIEZOELECTRIC BODY," and filed on Feb. 15, 2022 International Application No. PCT/JP2022/005812 claims priority to Japanese Patent Application No. 2021-022030 filed on Feb. 15, 2021. The entire contents of each of the above-listed applications are hereby incorporated by reference for all purposes.

TECHNICAL FIELD

The present invention relates to an information processing method, an information processing system, and a program.

BACKGROUND ART

Technologies for converting three-dimensional model data such as CAD data into three-dimensional point cloud data have been known. For example, Patent Literature 1 discloses a technology for converting CAD data into three-dimensional point cloud data, in which the CAD data is STL data in which a surface shape of an object(s) is expressed by an aggregation of triangles in an approximated manner, and coordinates of each vertex of each triangle are represented by point data.

CITATION LIST

Patent Literature

Patent Literature 1: Japanese Unexamined Patent Application Publication No. 2020-27654

SUMMARY

Technical Problem

However, in STL data, surface shapes are expressed in an approximated manner. Therefore, when only the STL data is used, a difference occurs between the model shape represented by the original AD data and that represented by the three-dimensional point cloud data. Therefore, in the invention disclosed in Patent Literature 1, a highly accurate three-dimensional point cloud data model is generated by further using a sub-point cloud and curvature data.

However, although highly accurate three-dimensional point cloud data that closely represents the model shape of the CAD data can be generated, the positions of point data in the generated three-dimensional point cloud data are not uniformly arranged. Therefore, it is not possible to compare the reference model shape of the CAD data, which is the reference data, with the model shape of the three-dimensional point cloud data, which is acquired from an actual object(s) by using an optical sensor or the like, and to determine, for example, whether the actual object(s) satisfies product standards.

In view of the above-described background, an object of the present invention is to provide a technology for making it possible to easily extract, from an three-dimensional model data, three-dimensional point cloud data having a regular arrangement like data generated by using a sensor, and to easily compare reference three-dimensional point cloud data obtained from reference three-dimensional model data with three-dimensional point cloud data obtained from an actual object(s).

Solution to Problem

An invention according to a main aspect of the present invention, which has been made to solve the above-described problem, is an information processing method including: a step of, by a three-dimensional model data acquisition unit, acquiring three-dimensional model data; a step of, by a reference plane setting unit, setting a reference plane around the acquired three-dimensional model data; a step of, by a regular position coordinate setting unit, setting regular position coordinates regularly arranged on the reference plane according to a predetermined rule; and
a step of, by a model point coordinate generation unit, generating model point coordinates at an intersection between a first virtual straight line extending from the regular position coordinates and the three-dimensional model data.

Other problems to be solved and their solutions disclosed in the present application will be clarified by descriptions of embodiments according to the invention and drawings thereof.

Advantageous Effects of Invention

According to the present invention, it is possible to easily generate three-dimensional model point cloud data from three-dimensional model data and to generate point cloud data in which, unlike conventional three-dimensional model point cloud data, point data are regularly arranged as in three-dimensional measured point cloud data acquired by a sensor, thereby making it possible to easily compare the three-dimensional model point cloud data obtained from the three-dimensional model data, which is the reference data, with the three-dimensional measured point cloud data obtained from an actual object(s).

DESCRIPTION OF EMBODIMENTS

Figure 1:
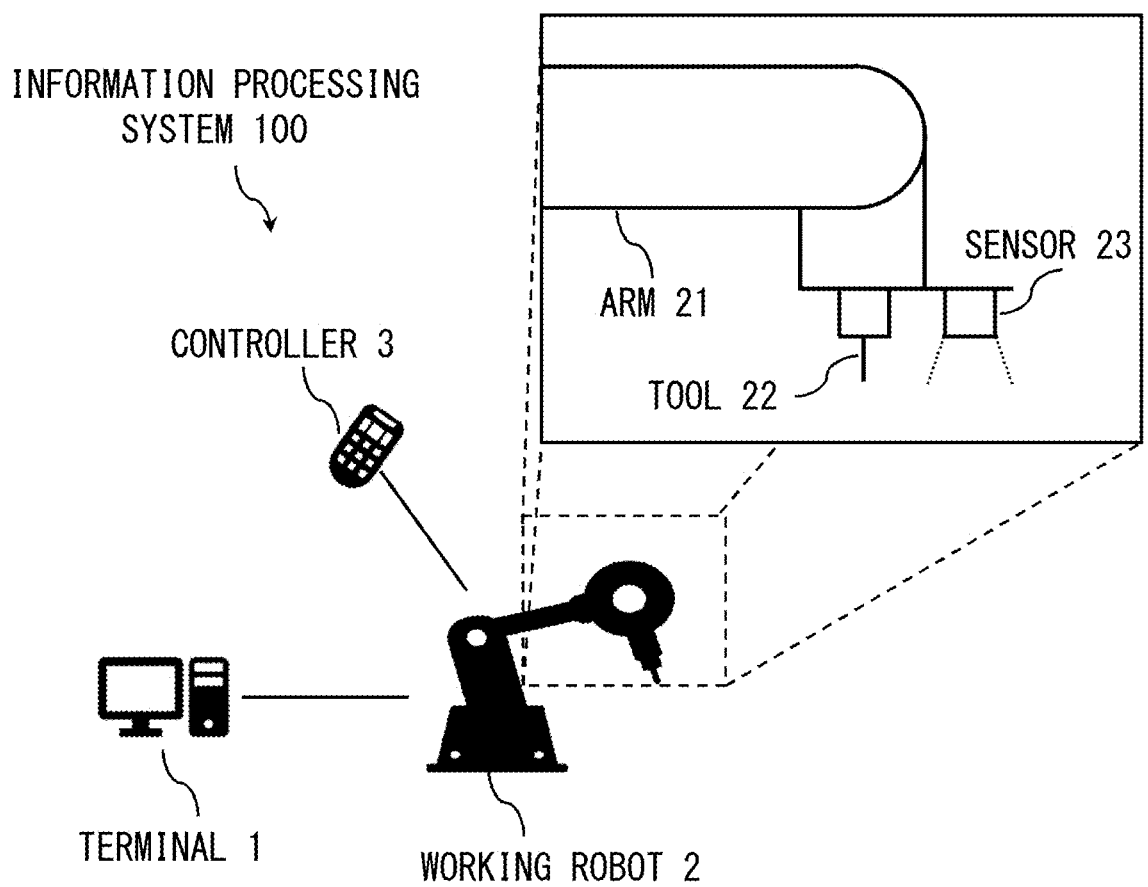
FIG. 1 shows an example of an overall configuration of an information processing system 100 according to a first embodiment.

Details of embodiments according to the present invention will be described one by one. The present invention includes, for example, the following features.

[Item 1]
An information processing method including:
a step of, by a three-dimensional model data acquisition unit, acquiring three-dimensional model data;
a step of, by a reference plane setting unit, setting a reference plane around the acquired three-dimensional model data;
a step of, by a regular position coordinate setting unit, setting regular position coordinates regularly arranged on the reference plane according to a predetermined rule; and
a step of, by a model point coordinate generation unit, generating model point coordinates at an intersection between a first virtual straight line extending from the regular position coordinates and the three-dimensional model data.

[Item 2]
The information processing method described in Item 1, in which the three-dimensional model data is data containing information about a surface representing a shape of an object.

[Item 3]
The information processing method described in Item 1 or 2, in which the step of setting the reference plane includes:
a step of setting a three-dimensional reference range of a three-dimensional shape surrounding the three-dimensional model data; and
a step of setting a predetermined surface of the three-dimensional shape as the reference plane.

[Item 4]
The information processing method described in any one of Items 1 to 3, in which the step of setting the regular position coordinates regularly arranged according to the predetermined rule is a step of setting intersections of second virtual straight lines arranged at a predetermined interval in a lattice pattern in the reference plane as the regular position coordinates.

[Item 5]
The information processing method described in any one of Items 1 to 4, in which in the step of generating the model point coordinates at the intersection between the first virtual straight line and the three-dimensional model data, the model point coordinates are generated at an intersection between the first virtual straight line and a front side of the three-dimensional model data as the model point coordinates.

[Item 6]
The information processing method described in any one of Items 1 to 5, further including:
a step of, by a three-dimensional measured point cloud data acquisition unit, acquiring three-dimensional measured point cloud data obtained by measurement by a sensor; and
a step of, by a fitting unit, aligning three-dimensional model point cloud data with the three-dimensional measured point cloud data, the three-dimensional model point cloud data being a set of a plurality of model point coordinates.

[Item 7]
The information processing method described in Item 6, in which the step of the alignment includes a step of aligning the three-dimensional model point cloud data and the three-dimensional measured point cloud data so that they are brought as close to each other as possible.

[Item 8]
An information processing system including:
a three-dimensional model data acquisition unit configured to acquire three-dimensional model data;
a reference plane setting unit configured to set a reference plane around the acquired three-dimensional model data;
a regular position coordinate setting unit configured to set regular position coordinates regularly arranged on the reference plane according to a predetermined rule; and
a model point coordinate generation unit configured to generate model point coordinates at an intersection between a first virtual straight line extending from the regular position coordinates and the three-dimensional model data.

[Item 9]
A program for causing a computer to perform an information processing method, in which the program causes the computer, as the information processing method, to perform:
a step of, by a three-dimensional model data acquisition unit, acquiring three-dimensional model data;
a step of, by a reference plane setting unit, setting a reference plane around the acquired three-dimensional model data;
a step of, by a regular position coordinate setting unit, setting regular position coordinates regularly arranged on the reference plane according to a predetermined rule; and
a step of, by a model point coordinate generation unit, generating model point coordinates at an intersection between a first virtual straight line extending from the regular position coordinates and the three-dimensional model data.

Details of First Embodiment

Specific examples of information processing systems 100 according to embodiments of the present invention will be described hereinafter with reference to the drawings. Note that the present invention is not limited to these examples but is represented by the scope of the claims. Further, all modifications within the meaning and scope equivalent to those of the scope of the claims are included in the invention. The same or similar elements are assigned the same or similar reference numerals (or symbols) and the same or similar names in the following description and the accompanying drawings. Further, redundant descriptions of the same or similar elements may be omitted as appropriate in the descriptions of embodiments. Further, features shown in one embodiment can be applied to other embodiments as long as they do not contradict those in the other embodiments.

FIG. 1 shows an example of an information processing system 100 according to an embodiment. As shown in FIG. 1, the information processing system 100 according to this embodiment includes a terminal 1, a working robot 2, and a controller 3. The working robot 2 includes at least an arm 21, a tool 22, and a sensor 23. The terminal 1, the controller 3, and the working robot 2 are connected to each other through wires or wirelessly so that they can communicate with each other. Note that the sensor 23 does not necessarily have to be disposed in the working robot 2, and may have any configuration as long as it can acquire three-dimensional point cloud data from the object.

<Terminal 1>

Figure 2:
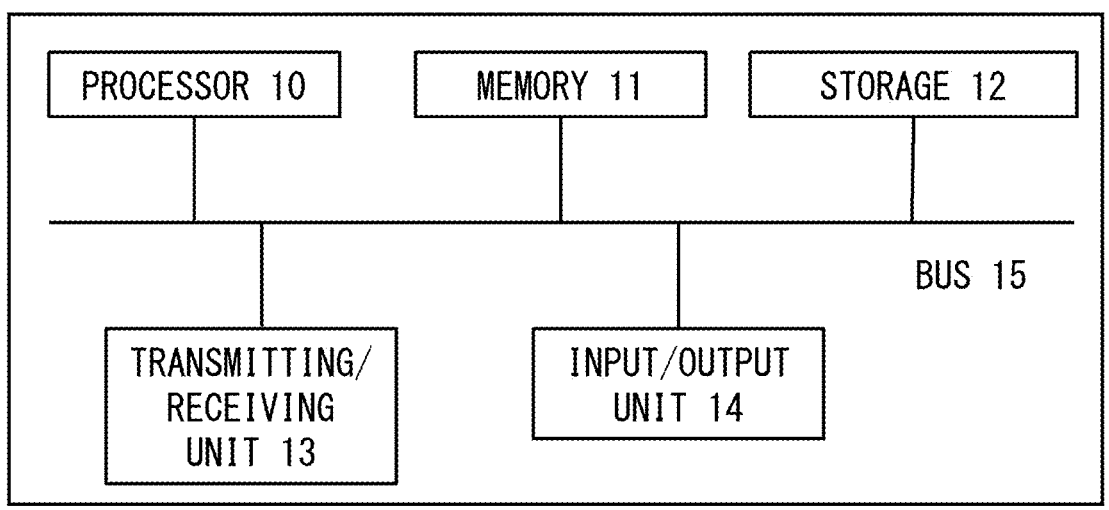
FIG. 2 shows an example of a hardware configuration of a terminal 1 according to the first embodiment.

FIG. 2 shows a hardware configuration of the terminal 1. The terminal 1 may be, for example, a general-purpose computer such as a personal computer, or may be logically implemented by a cloud computing system. Note that the above-described configuration shown in the drawing is merely an example, and the terminal 1 may have other configurations. For example, some of the functions provided in a processor 10 of the terminal 1 may be implemented by an external server or another terminal.

The terminal 1 includes at least a processor 10, a memory 11, a storage 12, a transmitting/receiving unit 13, an input/output unit 14, and so on, and they are electrically connected to each other through a bus 15.

The processor 10 is an arithmetic apparatus that controls the overall operation of the terminal 1, controls at least the transmission/reception of data and the like to/from the working robot 2, and performs information processing and the like necessary for the execution of applications and authentication processing. For example, the processor 10 is a CPU (Central Processing Unit) and/or a GPU (Graphics Processing Unit), and performs various types of information processing by executing a program and the like for the system which is originally stored in the storage 12 and deployed in (i.e., loaded into) the memory 11.

The memory 11 includes a main storage composed of a volatile storage device such as a DRAM (Dynamic Random Access Memory) and an auxiliary storage composed of a nonvolatile storage device such as a flash memory or an HDD (Hard Disc Drive). The memory 11 is used as a work area or the like of the processor 10, and also stores a BIOS (Basic Input/Output System), which is executed when the terminal 1 is powered on, and various setting information items and the like.

The storage 12 stores various programs such as application programs. A database in which data used for various processes is stored may be formed in the storage 12.

The transmitting/receiving unit 13 connects the terminal 1 to at least the working robot 2, and transmits and receives data and the like according to instructions from the processor. Further, the transmitting/receiving unit 13 is formed as a wired or wireless unit. In the case where the transmitting/receiving unit 13 is formed as a wireless unit, it may be configured by, for example, WiFi or a short-range communication interface such as Bluetooth (Registered Trademark) or BLE (Bluetooth Low Energy), and transmits/receives data and the like to/from an entity or the like disposed outside the terminal 1.

When the terminal 1 is, for example, composed of a personal computer, the input/output unit 14 is composed of an information output apparatus (e.g., a display device) and an information input apparatus (e.g., a keyboard and a mouse), whereas when the terminal 1 is composed of a smartphone or a tablet-type terminal, the input/output unit 14 is composed of an information input/output apparatus such as a touch panel.

The bus 15 is connected, as a common bus, to each of the above-described elements, and address signals, data signals, various control signals, and the like are transmitted through the bus 15.

<Working Robot 2>

The working robot 2 according to this embodiment will be described by referring to FIG. 1 again.

As described above, the working robot 2 includes the arm 21, the tool 22, and the sensor 23. Note that the above-described configuration shown in the drawing is merely an example, and the configuration of the working robot 2 is not limited to the above-described configuration.

The operation of the arm 21 is controlled by the terminal 1 based on a three-dimensional robot coordinate system. Further, the arm 21 may also include the controller 3 connected to the working robot 2 through a wire or wirelessly, and its operation may be controlled by the controller 3.

The operation of the tool 22 is controlled by the terminal 1 based on a three-dimensional tool coordinate system. Further, regarding the structure of the tool 22, whether or not a particular tool can be included therein depends on its purpose. Examples of includable tools include a welding torch, a paint spraying device for painting, a grasping device, an excavating device, and a polishing device.

Figure 4:
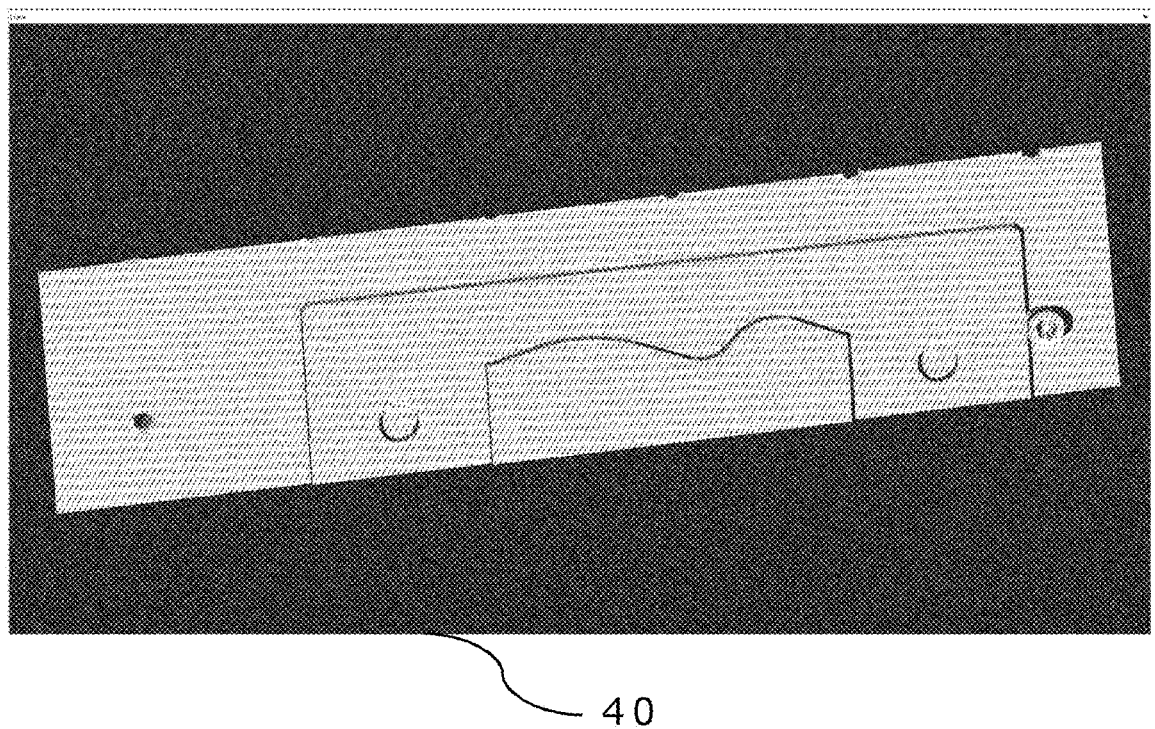
FIG. 4 shows an example of a displayed three-dimensional point cloud data according to the first embodiment.

The sensor 23 performs sensing for an object based on a three-dimensional sensor coordinate system. The sensor 23 is, for example, a laser sensor that operates as a three-dimensional scanner, and acquires three-dimensional measured point cloud data 40 of an object by performing sensing. The three-dimensional measured point cloud data 40 is, for example, three-dimensional measured point cloud data 40 as shown in FIG. 4, in which each point data has coordinate information in a sensor coordinate system, so that it is possible to recognize (i.e., find) the shape of the object by the point cloud in which point data are regularly arranged.

Note that the robot coordinate system, the tool coordinate system, and the sensor coordinate system may be associated with each other by performing a predetermined calibration before the actual work is performed. By doing so, the working robot 2 may be configured so that, by having a user designate a position (coordinates) based on, for example, the sensor coordinate system, the operations of the arm 21 and the tool 22 may be controlled based on their corresponding positions.

<Function of Terminal 1>

Figure 3:
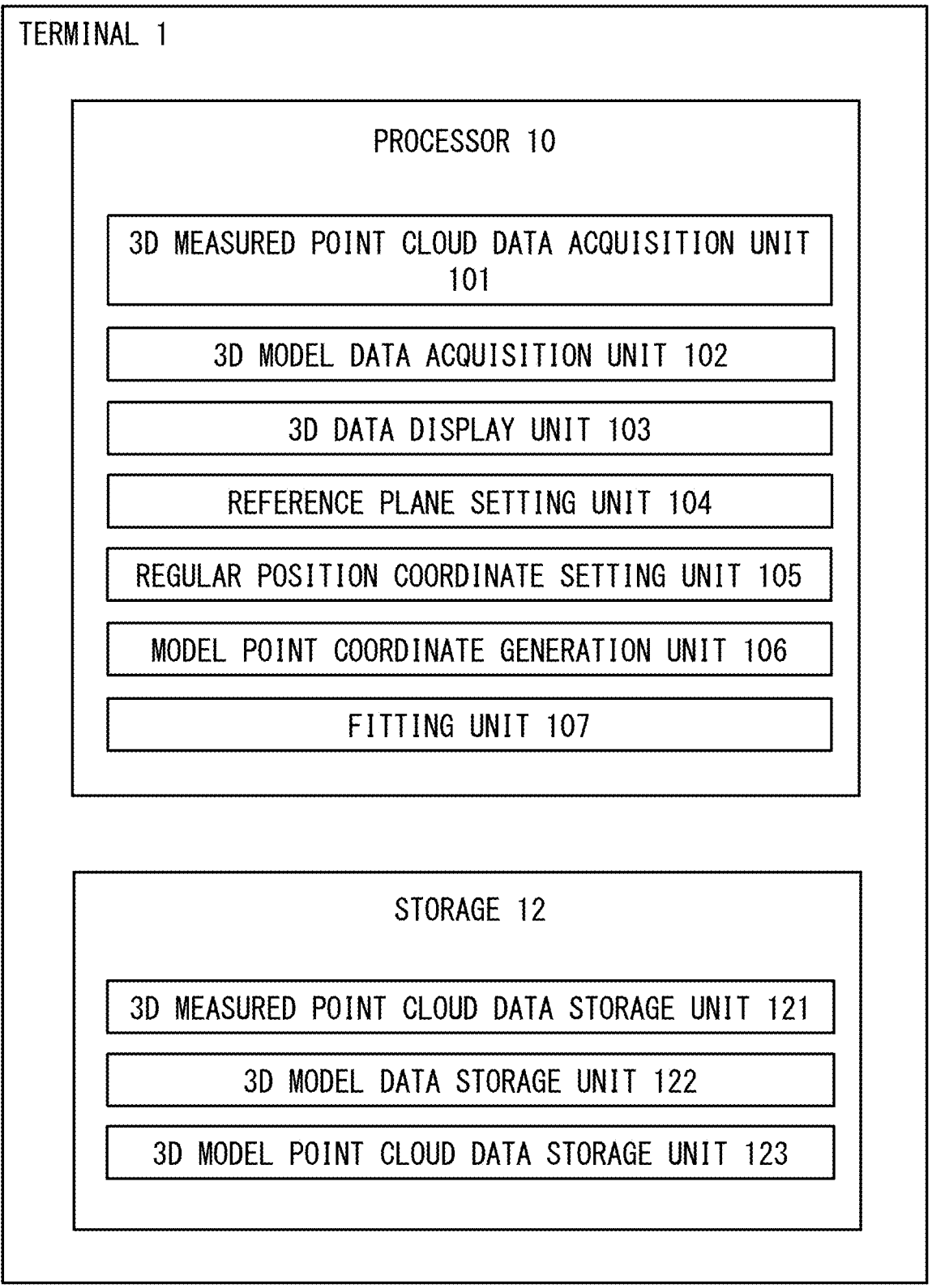
FIG. 3 shows an example of a functional configuration of the terminal 1 according to the first embodiment.

FIG. 3 is a block diagram showing an example of functions implemented in the terminal 1. In this embodiment, the processor 10 of the terminal 1 includes a three-dimensional measured point cloud data acquisition unit 101, a three-dimensional model data acquisition unit 102, a three-dimensional data display unit 103, a reference plane setting unit 104, a regular position coordinate setting unit 105, a model point coordinate generation unit 106, and a fitting unit 107. Further, the storage 12 of the terminal 1 includes a three-dimensional measured point cloud data storage unit 121, a three-dimensional model data storage unit 122, and a three-dimensional model point cloud data storage unit 123.

The three-dimensional measured point cloud data acquisition unit 101 controls, for example, the working robot 2 according to an instruction from the input/output unit 14 of the terminal 1, and acquires three-dimensional measured point cloud data of the object by the sensor 23. The acquired three-dimensional point cloud data is, for example, three-dimensional coordinate information data based on the sensor coordinate system and is stored in the three-dimensional measured point cloud data storage unit 121.

The three-dimensional model data acquisition unit 102 acquires, for example, three-dimensional model data, which serves as the reference model of the object, received from the transmitting/receiving unit 13 of the terminal 1. The three-dimensional model data may be any data containing information about a surface representing the shape of the object. For example, the three-dimensional model data may be CAD data, mesh data such as STL data, or surface data. The acquired three-dimensional model data is stored in the three-dimensional model data storage unit 122. The three-dimensional model data is, for example, data based on a three-dimensional coordinate system in a virtual space. Note that the acquisition of three-dimensional model data is not limited to the above-described method and the like. For example, three-dimensional model data created in an application that is the same as or different form the application of the terminal 1 may be acquired.

Figure 5:
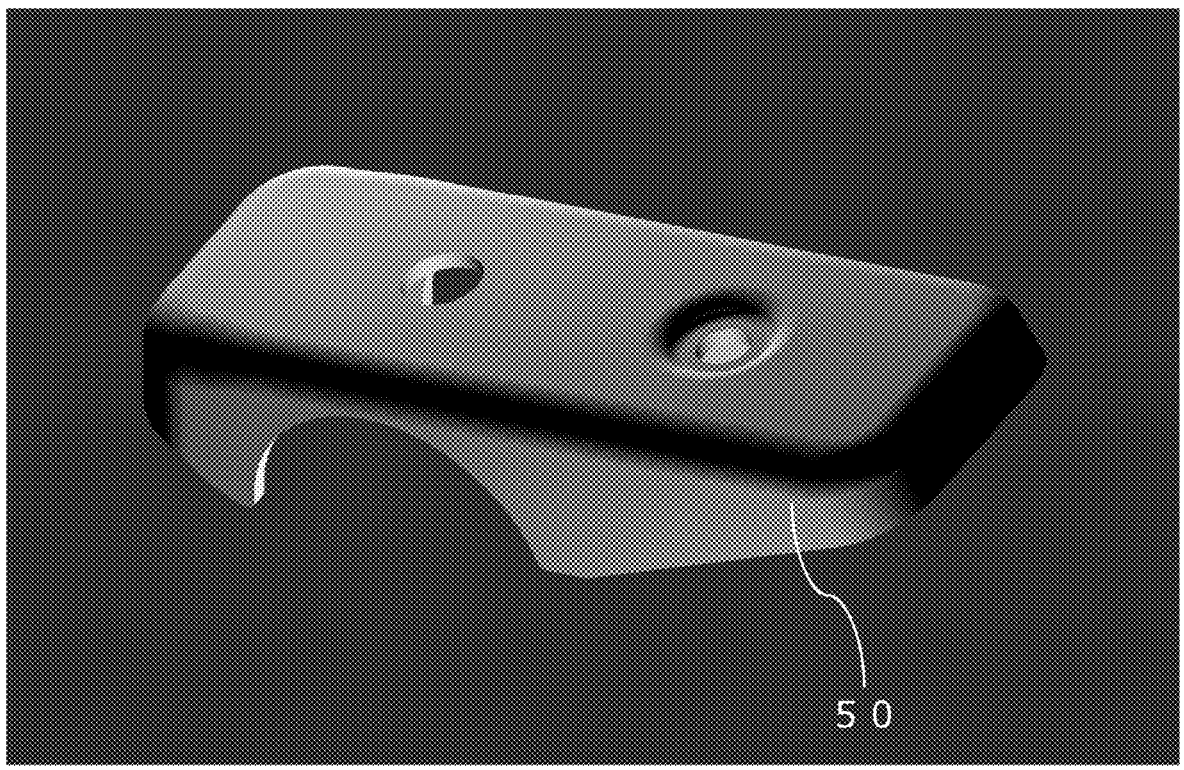
FIG. 5 shows an example of a displayed three-dimensional model data according to the first embodiment.

The three-dimensional data display unit 103 displays the three-dimensional measured point cloud data 40 acquired by the three-dimensional measured point cloud data acquisition unit 101, for example, in the input/output unit 14 of the terminal 1 as shown in FIG. 4. Further, the three-dimensional data display unit 103 displays the three-dimensional model data 50 acquired by the three-dimensional model data acquisition unit 102, for example, in the input/output unit 14 of the terminal 1 as shown in FIG. 5. A user can look at the displayed three-dimensional point cloud data or the three-dimensional model data from an arbitrary direction (i.e., at an arbitrary angle). In this case, as described above, when the terminal 1 is, for example, composed of a personal computer, the input/output unit 14 is composed of an information output apparatus (e.g., a display device) and an information input apparatus (e.g., a keyboard and a mouse), whereas when the terminal 1 is composed of a smartphone or a tablet-type terminal, the input/output unit 14 is composed of an information input/output apparatus such as a touch panel. Further, it is possible to designate the aforementioned arbitrary direction by the input/output unit 14.

Figure 6:
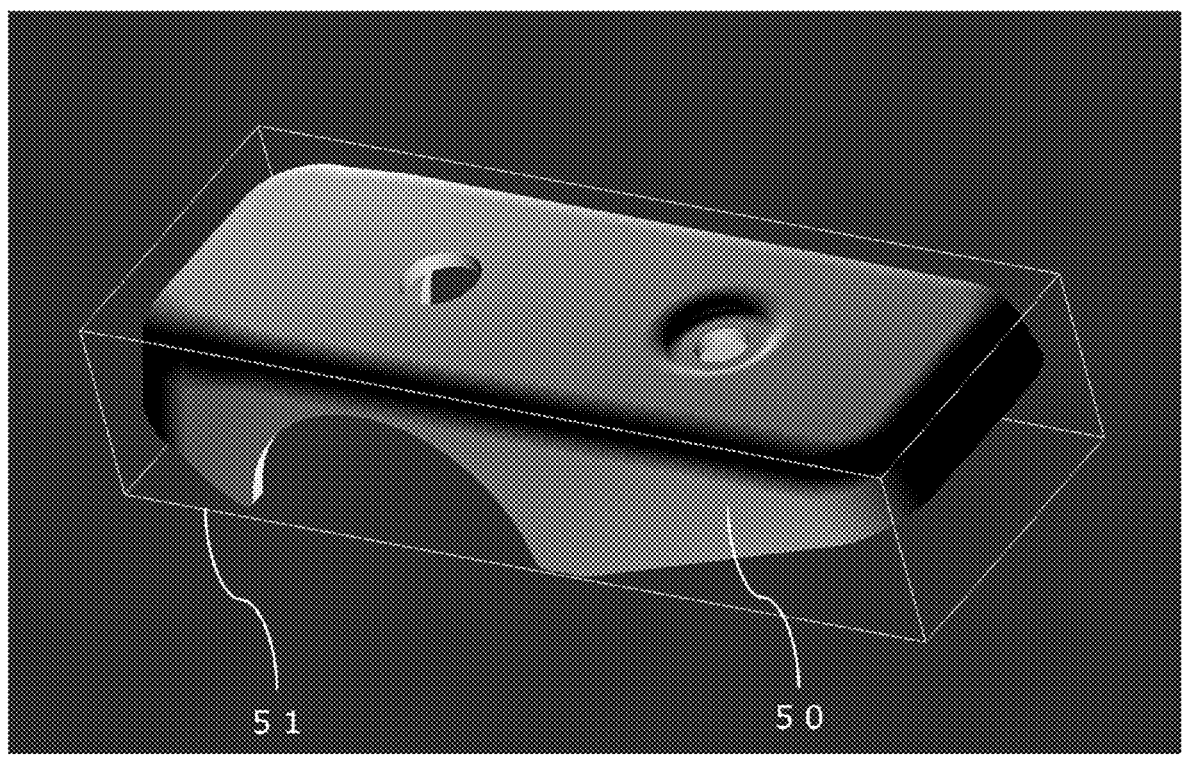
FIG. 6 shows an example of a displayed three-dimensional reference range according to the first embodiment.
Figure 7:
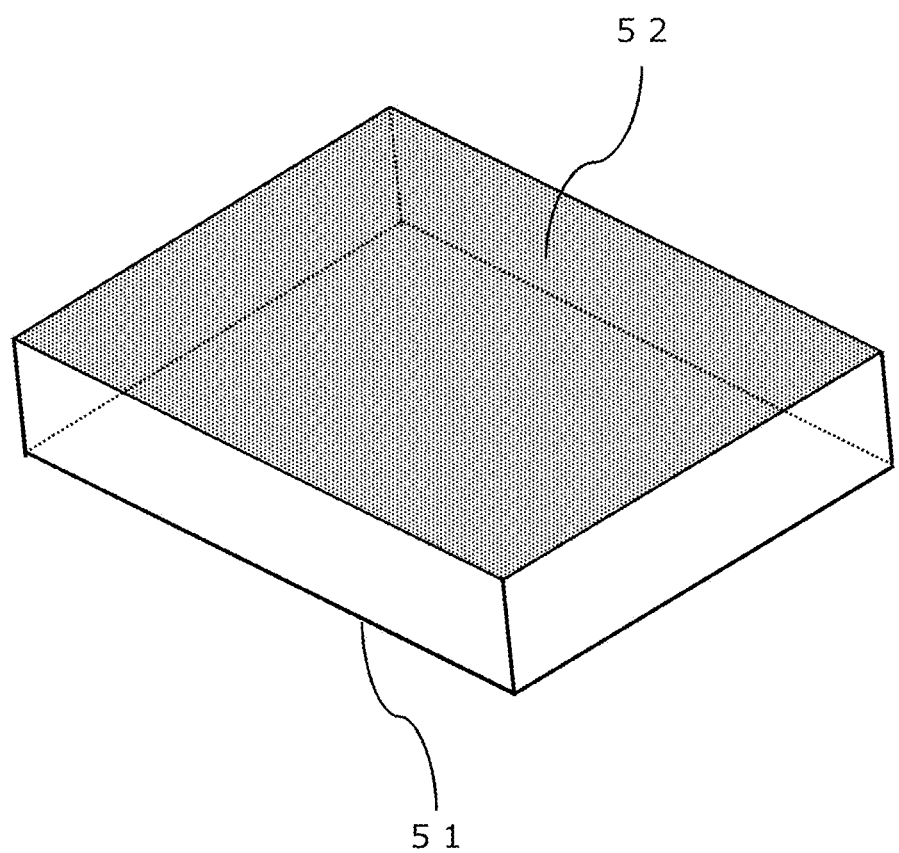
FIG. 7 shows an example of a reference plane according to the first embodiment.

For example, the reference plane setting unit 104 determines, in the three-dimensional coordinate system in the virtual space in which the three-dimensional model data 50 is disposed as shown in FIG. 6, a range in which the three-dimensional model data 50 is present by a known method, and thereby sets a three-dimensional reference range 51 surrounding the three-dimensional model data 50. Further, the reference plane setting unit 104 sets a reference plane 52 used by the regular position coordinate setting unit 105 and the like (which will be described later) for at least one surface (e.g., the top surface of a rectangular parallelepiped in FIG. 7) in the three-dimensional reference range 51. Note that the three-dimensional reference range is not limited to the rectangular parallelepipeds as shown in FIGS. 6 and 7, but may have any of various three-dimensional shapes having a surface(s), such as a cube, a square cylinder, and a cylinder.

Further, as another embodiment, the reference plane setting unit 104 may set a certain surface (e.g., an x-y plane, a y-z plane, an x-z plane, or the like) located at an arbitrary position around the three-dimensional model data 50 as a reference plane 52 without setting the three-dimensional reference range 51. In particular, the reference plane setting unit 104 may first analyze, for example, the size of the three-dimensional model data 50 in the virtual space, and then calculate the position where, when a surface is disposed, the area covered by the surface is maximized or the position where a part of the object opposed to the surface become the flattest so that the aforementioned certain surface can be disposed in the position of the top surface of the rectangular parallelepiped in FIGS. 6 and 7, and set the calculated position as the reference plane 52.

Further, regarding the reference plane setting unit 104, as another embodiment, a user may manually set the three-dimensional reference range 51 or the reference plane 52 by using the information input apparatus of the input/output unit 14 as shown in FIG. 5 in a state in which it is displayed in the information output apparatus. More specifically, for example, it may be configured so as to dispose the reference plane 52 by selecting the positions of a plurality of vertices (e.g., four points) by the information input apparatus, generating a three-dimensional shape such as a rectangular parallelepiped according to the selected vertices, adjusting the positions of the vertices, the positions of the sides, the radius, and the like, and thereby changing the size of the three-dimensional shape, and adjusting the size and orientation of the surface model. Alternatively, the user operates (e.g., edits) the three-dimensional model data 50 displayed in the information output apparatus of the input/output unit 14, changes the orientation of the three-dimensional model data 50 so that it conforms to, for example, the scanning direction of the sensor 23, and then manually set the surface surrounding the three-dimensional model data 50 in that state. After that, the user may set a three-dimensional reference range 51 having a three-dimensional shape (see, for example, FIG. 6) in which the above-described set surface is positioned at the position of the end, in the direction perpendicular to the set surface, of the three-dimensional model data 50.

Figure 8:
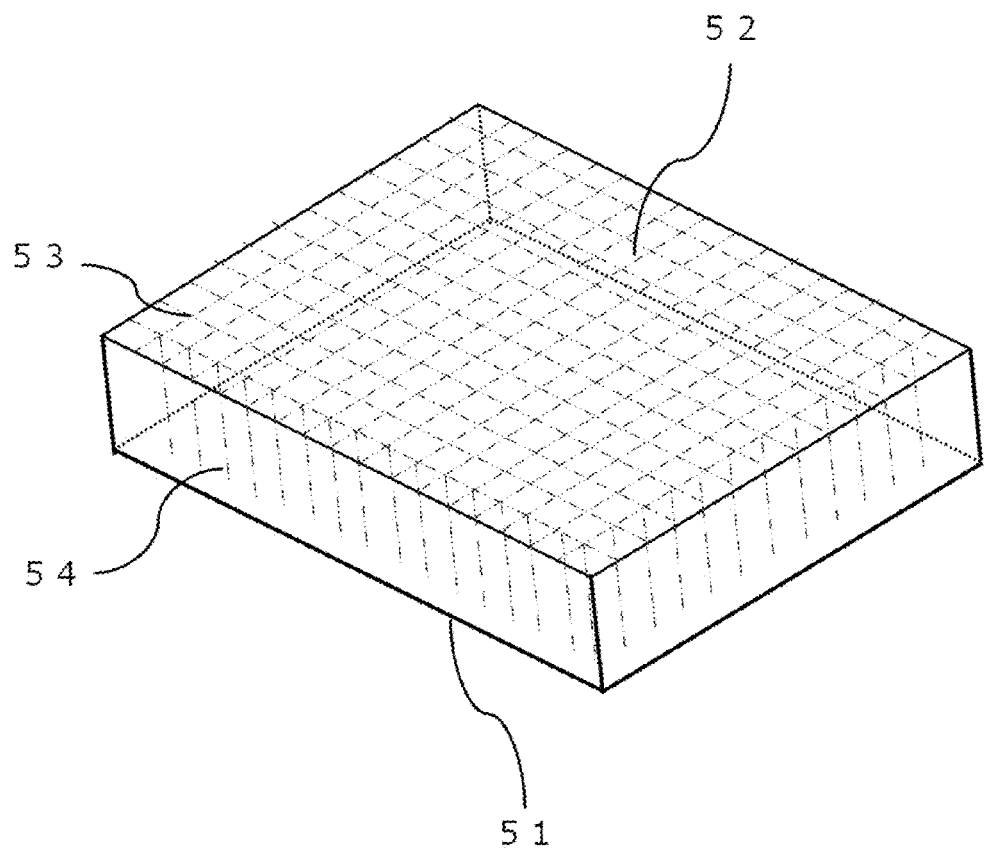
FIG. 8 shows an example of regular position coordinates according to the first embodiment.

The regular position coordinate setting unit 105 sets, for example, a plurality of regularly arranged regular position coordinate information data 53 (i.e., regular position coordinate information data 53 in which a plurality of point data are regularly arranged) on the reference plane 52 set by the reference plane setting unit 104 as shown in FIG. 8. For example, in FIG. 8, intersections of virtual straight lines arranged at predetermined intervals in a lattice pattern on the reference plane 52 may be set as the regular position coordinate information data 53. Note that the lattice pattern may be, but is not limited to, a "#"-like lattice pattern or a cross lattice pattern. Further, the lattice pattern may not be used as long as the regularly arranged regular position coordinate information data 53 can be set. For example, a method in which regular position coordinate information data 53 is successively set on the reference plane 52 at predetermined intervals in a seamless manner while the first corner of the reference plane 52 as the setting start position.

Figure 9:
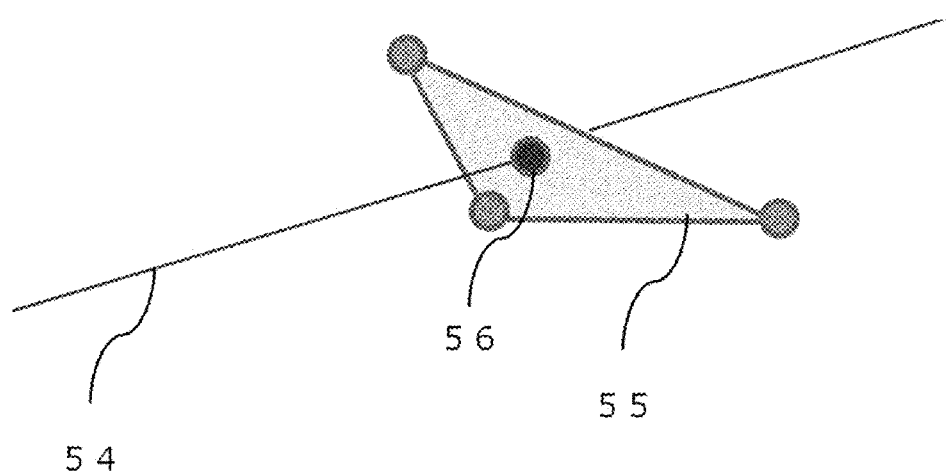
FIG. 9 shows an example of model point coordinates according to the first embodiment.

The model point coordinate generation unit 106 generates, as model point coordinate information data 56, points (intersections) at which virtual straight lines 54 each of which extends from the coordinate position indicated by a respective one of the above-described regular position coordinate information data 53 passes through the three-dimensional model data 50 as shown in FIG. 9 (in particular, STL data having a triangle mesh 55 in the example shown in FIG. 9). The virtual straight lines 54 may be, for example, straight lines extending perpendicular to the reference plane 52, or may be straight lines extending at a predetermined angle with respect to the reference plane 52. The model point coordinate information data 56 of the generated three-dimensional model point cloud data 57 is stored in the three-dimensional model point cloud data storage unit 123.

Figure 10:
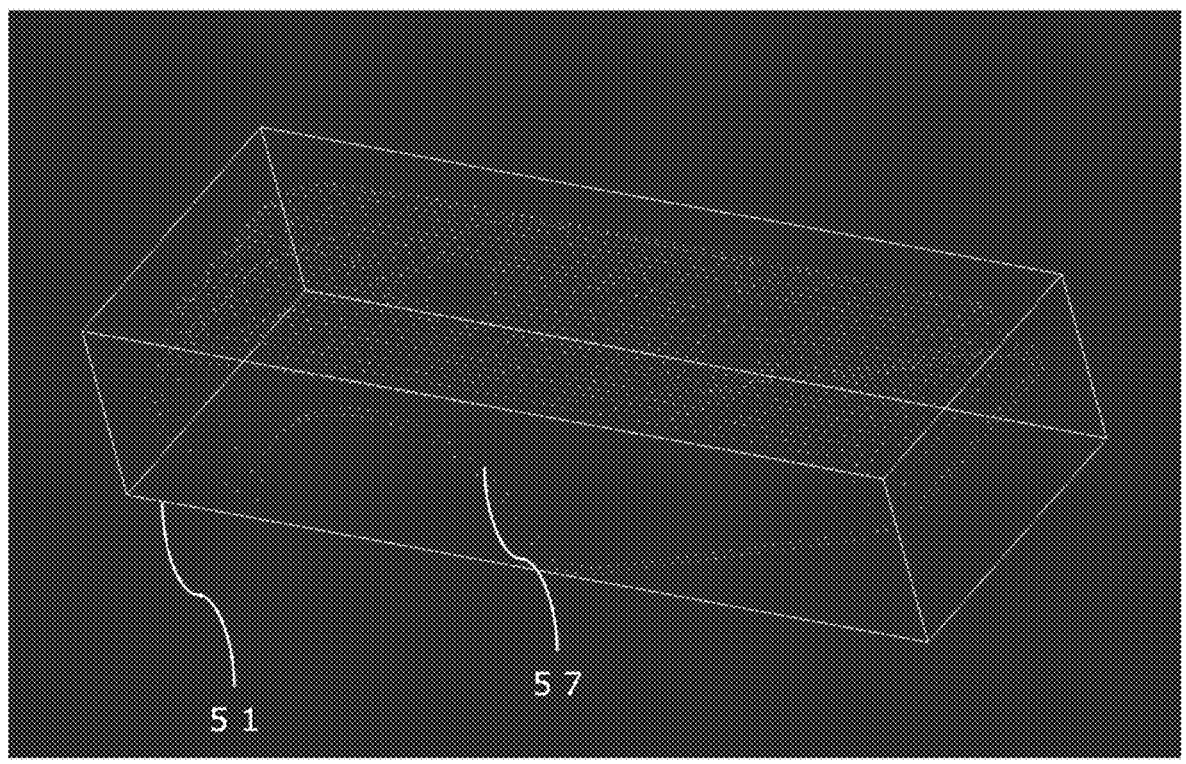
FIG. 10 shows an example of a displayed three-dimensional model point cloud data according to the first embodiment.
Figure 11:
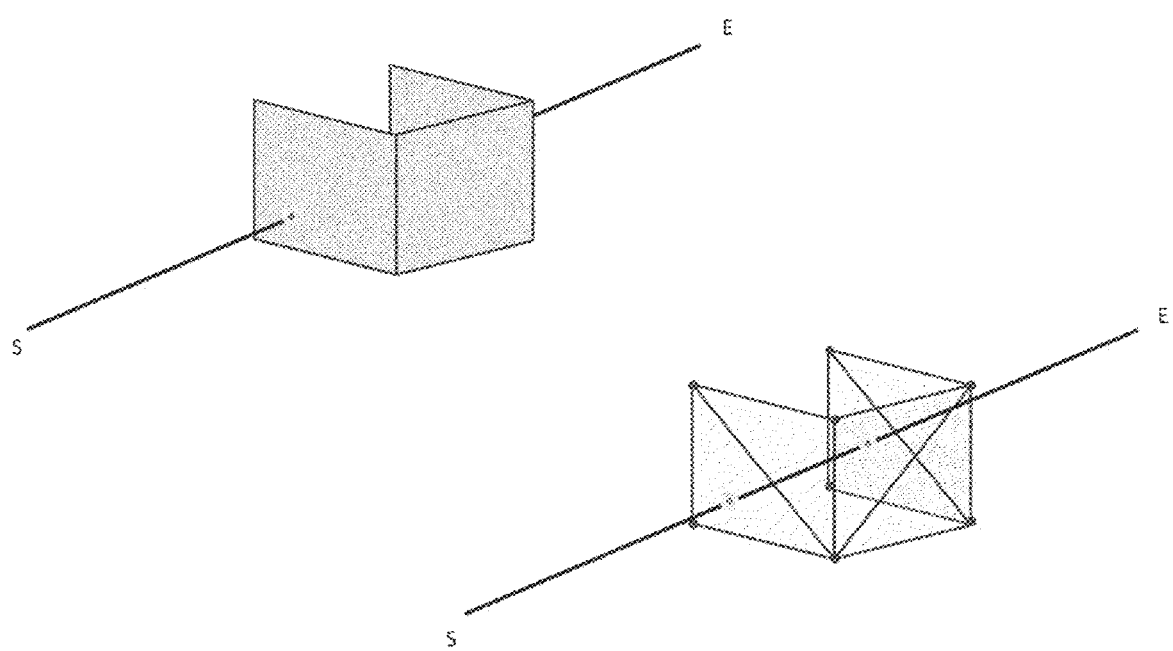
FIG. 11 shows an example for front and rear of three-dimensional model data according to the first embodiment.
Figure 12:
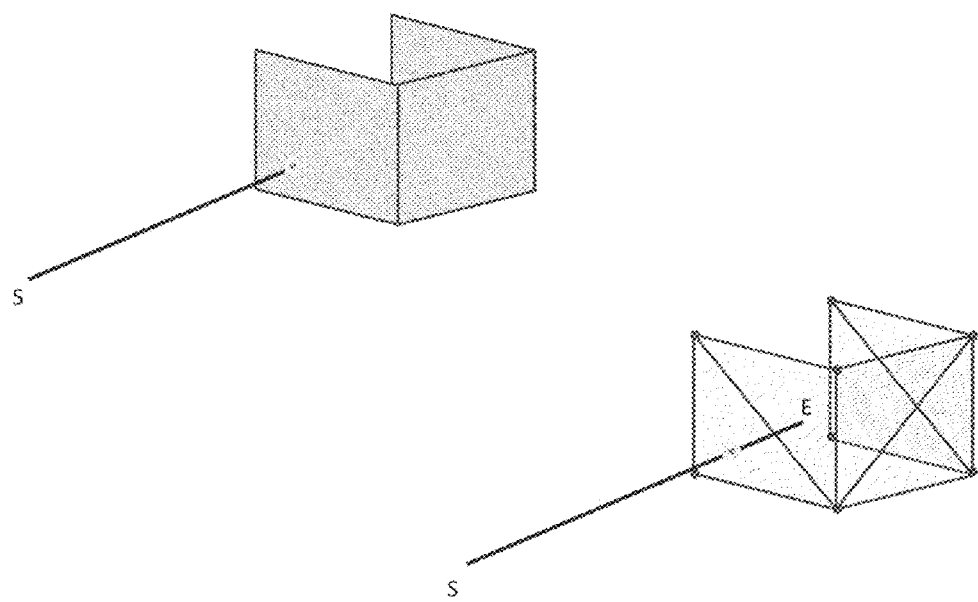
FIG. 12 shows another example for front and rear of three-dimensional model data according to the first embodiment.

Note that the three-dimensional data display unit 103 may display the three-dimensional model point cloud data 57, for example, in the input/output unit 14 of the terminal 1 as shown in FIG. 10. Further, when there are a front side and a rear side in the three-dimensional model data 50, for example, points at which straight lines pass through the front side and the rear side are generated as shown in FIG. 11, and whether the front side or the rear side should be used may be determined in advance. In this case, although the intersections on the front side are preferred, they are not limited to those on the front side. That is, they may be the intersections on the rear side. Alternatively, as shown in FIG. 12, when the length of the virtual straight lines 54 is not infinite, and the distance from the reference plane 52 to the three-dimensional model data 50 or the thickness of the three-dimensional model data 50 is known, the virtual straight lines 54 may have a predetermined finite length, so that only the intersections on the front side can be acquired.

The fitting unit 107 aligns the three-dimensional measured point cloud data 40 with the three-dimensional model point cloud data 57 (i.e., performs the so-called fitting). The fitting may be performed by a known method. However, it may be, for example, to set each of the point data of the three-dimensional model point cloud data 57 and the three-dimensional measured point cloud data 40 so that they are brought as close to each other as possible. As a more specific example, for each of point data which are included in the three-dimensional model point cloud data 57 (or the three-dimensional measured point cloud data 40) and of each of which a distance from the three-dimensional measured point included in the three-dimensional measured point cloud data 40 (or the three-dimensional model point cloud data 57) is equal to or shorter than a predetermined search range radius L, a distance L between that point data and the three-dimensional measured point is calculated. Then, an average value of the shortest distances L' among the distances L or an average value of all the distances L is calculated. Then, the three-dimensional model point cloud data 57 (or the three-dimensional measured point cloud data 40) is moved, and the above-described average is calculated again. The above-described calculation is performed a plurality of times, and the position of the three-dimensional model point cloud data 57 (or the three-dimensional measured point cloud data 40) of which the above-described average value is the smallest is set as the fitting position.

The fitting unit 107 may, after performing further alignment, show a difference between the shape of three-dimensional model point cloud data 57 and that of the three-dimensional measured point cloud data 40 by a known method.

<Flowchart of Information Processing Method>

Figure 13:
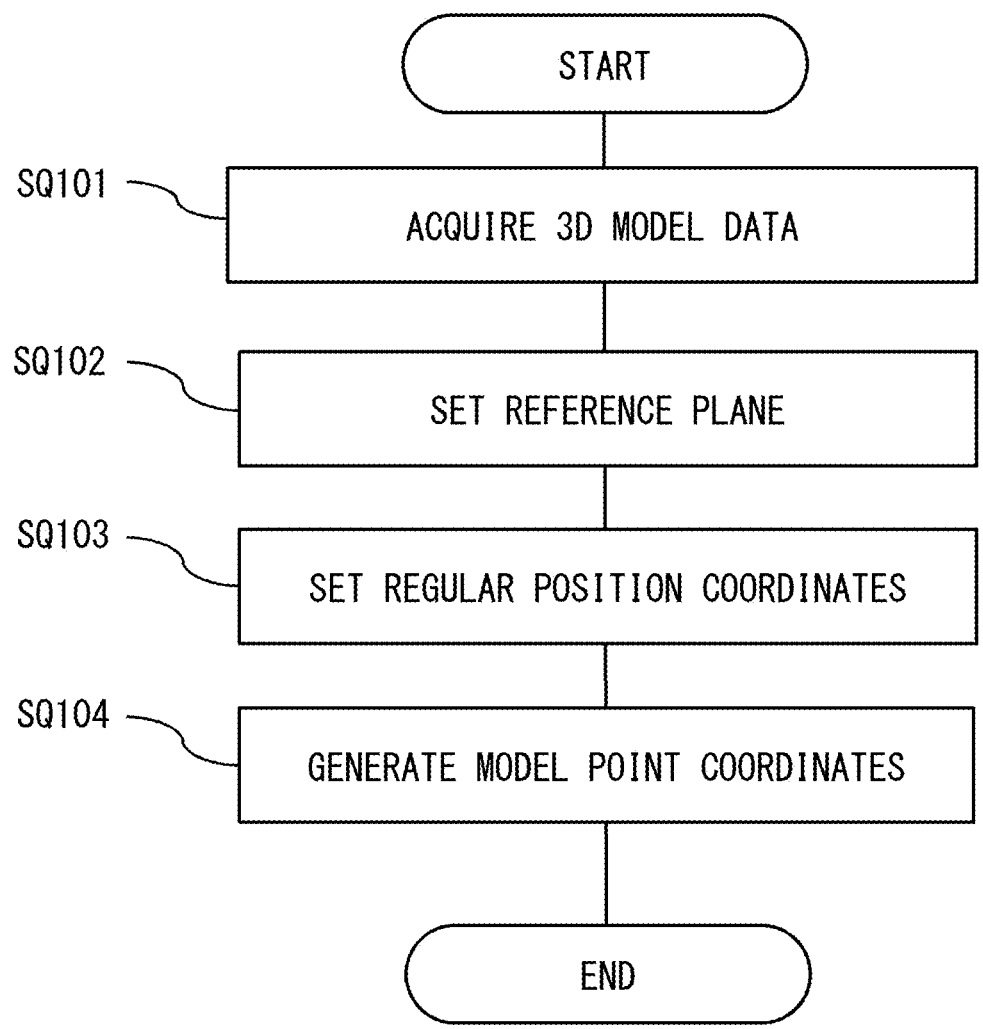
FIG. 13 shows an example of a flowchart of an information processing method according to the first embodiment.

FIG. 13 is an example of a flowchart of an information processing method performed in the information processing system 100 according to this embodiment.

Firstly, a user operates the terminal 1 and acquires three-dimensional model data 50 by the three-dimensional model data acquisition unit 102 (SQ101).

Next, a reference plane 52 is set around the acquired three-dimensional model data 50 by the reference plane setting unit 104 of the terminal 1 (SQ102).

Next, regular position coordinates 53 that are regularly arranged on the reference plane 52 according to a predetermined rule are set by the regular position coordinate setting unit 105 of the terminal 1 (SQ103).

Next, by the model point coordinate generation unit 106 of the terminal 1, model point coordinates are generated at the passing-though points (the intersections) between virtual straight lines 54 extending from the regular position coordinates 53 and the three-dimensional model data 50 and stored as model point coordinate information data 56 (SQ104).

In this way, it becomes possible to easily generate three-dimensional model point cloud data 57 from the three-dimensional model data 50, and to generate three-dimensional model point cloud data 57 which are point cloud data in which, unlike conventional point cloud data, point data are regularly arranged as in the three-dimensional measured point cloud data 40 acquired by the sensor 23. Then, since the regularly arranged three-dimensional model point cloud data 57 is obtained as described above, it becomes possible to, in particular, handle it substantially in the same manner as the three-dimensional measured point cloud data 40 acquired by the sensor 23. Therefore, for example, the accuracy of the fitting between the three-dimensional model point cloud data 57 and the three-dimensional measured point cloud data 40 is greatly improved compared with the case where three-dimensional model point cloud data generated by a conventional method is used.

Although embodiments according to the present invention have been described above, the above-described embodiments are intended to facilitate the understanding of the present invention and are not intended to interpret the present invention in a limited manner. The present invention can be modified and improved without departing from the scope and spirit thereof, and the present invention includes its equivalents.

REFERENCE SIGNS LIST

1 TERMINAL
2 WORKING ROBOT
21 ARM
22 TOOL
23 SENSOR
3 CONTROLLER

The invention claimed is:

1. An information processing method performed by a processor configured to perform:
  acquiring three-dimensional model data;
  setting a reference plane around the acquired three-dimensional model data;
  setting regular position coordinates regularly arranged on the reference plane according to a predetermined rule;
  generating model point coordinates at an intersection between a first virtual straight line extending from the regular position coordinates and the three-dimensional model data; and
  the processor is further configured to perform:
    acquiring three-dimensional measured point cloud data obtained by measurement by a sensor; and
    aligning three-dimensional model point cloud data with the three-dimensional measured point cloud data, the three-dimensional model point cloud data being a set of a plurality of model point coordinates.

2. The information processing method according to claim 1, wherein the three-dimensional model data is data containing information about a surface representing a shape of an object.

3. The information processing method according to claim 1, wherein the setting the reference plane includes:
  setting a three-dimensional reference range of a three-dimensional shape surrounding the three-dimensional model data; and setting a predetermined surface of the three-dimensional shape as the reference plane.

4. The information processing method according to claim 1, wherein the setting the regular position coordinates includes setting intersections of second virtual straight lines arranged at a predetermined interval in a lattice pattern in the reference plane as the regular position coordinates.

5. The information processing method according to claim 1, wherein the generating the model point coordinates includes generating the model point coordinates at an intersection between the first virtual straight line and a front side of the three-dimensional model data.

6. The information processing method according to claim 1, wherein the aligning includes aligning the three-dimensional model point cloud data and the three-dimensional measured point cloud data so that they are brought as close to each other as possible.

7. An information processing system comprising:
a computer having a processor and memory;
a three-dimensional model data acquisition unit configured to acquire three-dimensional model data;
a reference plane setting unit configured to set a reference plane around the acquired three-dimensional model data;
a regular position coordinate setting unit configured to set regular position coordinates regularly arranged on the reference plane according to a predetermined rule; and
a model point coordinate generation unit configured to generate model point coordinates at an intersection between a first virtual straight line extending from the regular position coordinates and the three-dimensional model data.

8. A non-transitory computer readable medium storing program for causing a computer to perform an information processing method, the computer having a processor and memory, wherein the program causes the computer, as the information processing method, to perform:
a three-dimensional model data acquisition process of acquiring three-dimensional model data;
a reference plane setting process of, by a reference plane setting unit, setting a reference plane around the acquired three-dimensional model data;
a regular position coordinate setting process of setting regular position coordinates regularly arranged on the reference plane according to a predetermined rule; and
a model point coordinate generation process of generating model point coordinates at an intersection between a first virtual straight line extending from the regular position coordinates and the three-dimensional model data.

* * * * *